United States Patent
Wilke

(10) Patent No.: US 7,938,323 B2
(45) Date of Patent: May 10, 2011

(54) METHOD AND APPARATUS FOR MONITORING THE TRANSPORTATION OF A LUGGAGE ITEM

(75) Inventor: Wolf-Stephan Wilke, Constance (DE)

(73) Assignee: Siemens Aktiengesellschaft, Munich (DE)

( * ) Notice: Subject to any disclaimer, the term of this patent is extended or adjusted under 35 U.S.C. 154(b) by 65 days.

(21) Appl. No.: 12/482,866

(22) Filed: Jun. 11, 2009

(65) Prior Publication Data

US 2009/0308918 A1    Dec. 17, 2009

(30) Foreign Application Priority Data

Jun. 11, 2008   (DE) .......................... 10 2008 027 785
Apr. 7, 2009    (DE) .......................... 10 2009 016 628

(51) Int. Cl.
*G07B 15/02*    (2011.01)

(52) U.S. Cl. ........ 235/384; 235/375; 235/385; 235/451; 235/462.01; 235/492

(58) Field of Classification Search ................... 235/375, 235/384, 451, 487, 492, 462.01, 385
See application file for complete search history.

(56) References Cited

U.S. PATENT DOCUMENTS

| | | | |
|---|---|---|---|
| 5,299,116 A | | 3/1994 | Owens et al. |
| 6,158,658 A | | 12/2000 | Barclay |
| 6,698,653 B1 * | | 3/2004 | Diamond et al. ............. 235/375 |
| 6,970,088 B2 * | | 11/2005 | Kovach ...................... 340/572.1 |
| 7,286,634 B2 | | 10/2007 | Sommer, Jr. et al. |
| 7,775,437 B2 * | | 8/2010 | Cohen ....................... 235/462.45 |
| 2001/0000110 A1 * | | 4/2001 | Miksch et al. ............. 250/208.1 |
| 2002/0186862 A1 | | 12/2002 | McClelland et al. |
| 2004/0098276 A1 * | | 5/2004 | Blazey et al. ...................... 705/1 |
| 2006/0098842 A1 * | | 5/2006 | Levine ........................... 382/101 |
| 2006/0124723 A1 * | | 6/2006 | Satake et al. ................... 235/375 |
| 2007/0226088 A1 * | | 9/2007 | Miles et al. ..................... 705/28 |
| 2008/0198967 A1 * | | 8/2008 | Connelly et al. ................ 378/57 |

FOREIGN PATENT DOCUMENTS

| | | |
|---|---|---|
| DE | 100 40 550 A1 | 3/2002 |
| DE | 20 2004 008 602 U1 | 8/2004 |
| DE | 20 2006 016 881 U1 | 3/2008 |
| DE | 10 2006 049 454 A1 | 4/2008 |
| EP | 1914665 A2 | 4/2008 |
| WO | 2005/086616 A2 | 9/2005 |
| WO | 2007/059049 A2 | 5/2007 |
| WO | 2008003609 A1 | 1/2008 |

* cited by examiner

*Primary Examiner* — Thien M. Le
*Assistant Examiner* — Tuyen K Vo
(74) *Attorney, Agent, or Firm* — Laurence A. Greenberg; Werner H. Stemer; Ralph E. Locher

(57) ABSTRACT

A method and an apparatus monitor the transportation of a luggage item. What is to be monitored is a transportation process by which the luggage item is transported. At least one computer-accessible image of the luggage item is produced. The image shows the luggage item when illuminated with light visible to humans. A data record for the transportation process is produced, contains the image of the luggage item, and is stored in a data storage unit. The luggage item is taken to a checking device. The data storage unit is searched at least once for the data record for the transportation process. A display unit shows the image is included in the found data record. The image found is shown on the display unit such that a check becomes possible to determine whether the image shown actually shows the luggage item close to the display unit or another luggage item.

19 Claims, No Drawings

METHOD AND APPARATUS FOR MONITORING THE TRANSPORTATION OF A LUGGAGE ITEM

CROSS-REFERENCE TO RELATED APPLICATION

This application claims the priority, under 35 U.S.C. §119, of German application DE 10 2008 027 785.1, filed Jun. 11, 2008, and German application DE 10 2009 016 628.9, filed Apr. 7, 2009; the prior applications are herewith incorporated by reference in its entirety.

BACKGROUND OF THE INVENTION

Field of the Invention

The invention relates to a method and an apparatus for monitoring the transportation of a luggage item, particularly of a luggage item belonging to an air passenger.

International patent disclosure WO 2005/086616 A2, corresponding to U.S. Pat. Nos. 7,012,256, 7,244,941 and 7,286,634, describes a method and an apparatus for specifically examining a sequence of luggage items in a luggage conveyor installation, e.g. at an airport. Each luggage item is provided with an identifier on a mobile data storage medium in the form of a "tag". A respective X-ray image of the luggage item is taken and is displayed on a screen. A screener checks the X-ray image in order to find suspicious articles in the luggage item. If the screener has found a suspicious article in a luggage item, the screener makes an appropriate input into a computer system via a data link. On a "touch screen", the screener marks the depiction of the suspicious article in the X-ray image.

A database is used to store an identifier and the X-ray image of the suspicious luggage item. The suspicious luggage item is monitored on its further transportation path using its identifier which has been put on the "tag". At a particular point in the luggage conveyor installation, the luggage item is examined manually. A screen is used to show the X-ray image of this luggage item in order to assist the manual search.

International patent disclosure WO 2007/059049 A2 proposes a mobile data storage medium for a luggage item which it refers to as a "luggage brander". This data storage medium is attached to a luggage item and shows an identifier for the luggage item which can be read from a relatively long range.

German utility model DE 20 2006 016 881 U1 proposes providing a luggage item which is to be transported with a photograph of the owner. The photograph is stuck onto the luggage item in the form of a label, for example.

Published, non-prosecuted German patent application DE 10 040 550 A1 describes an apparatus which performs both article recognition and radio recognition. The article recognition evaluates a depiction of a luggage conveyor installation and establishes whether a luggage item is shown in the depiction. The radio recognition evaluates a mobile data storage medium in the form of an electronic "tag" with which a luggage item is provided. A processing device evaluates the results of both recognition operations in order to continue the transportation of the luggage item.

In published, non-prosecuted German patent application DE 10 2006 049 454 A1, a camera produces depictions of a predetermined trajectory of an article or of a predetermined space segment. An image processing installation checks whether a depicted article belongs to a prescribed group of articles. If this is the case, a transponder with which the article is provided is read. This reduces the risk of the reading result from a transponder being associated with a different article than the article which is provided with this transponder.

Apparatuses and methods for monitoring transportation processes are also known from U.S. Pat. No. 6,158,658, U.S. patent publication No. 20020186862 A1, U.S. Pat. No. 5,299,116 and German utility model DE 20 2004 008 602 U1.

SUMMARY OF THE INVENTION

It is accordingly an object of the invention to provide a method and an apparatus for monitoring the transportation of a luggage item which overcome the above-mentioned disadvantages of the prior art devices and methods of this general type, which allow monitoring even if a mobile data storage medium with which the luggage item has been provided is separated from the luggage item during transportation.

The solution provides a method and an apparatus which monitor the transportation of a luggage item. What is to be monitored is a transportation process by which the luggage item is transported. The same luggage item can be transported by various transportation processes in succession, e.g. by a first transportation process from a starting airport to a destination airport and by a second transportation process in the opposite direction.

The method includes the now described steps. At least one computer-accessible image of the luggage item is produced. The at least one image of the luggage item is produced such that it shows the luggage item when illuminated with light in the range visible to humans. A data record for the transportation process is produced. The data record contains the at least one image of the luggage item. The data record is stored in a data storage unit. The luggage item is taken to a checking device. The data storage unit is searched at least once for the data record for this transportation process. A display unit is used to show at least one image which is included in a data record which has been found. The data record may actually be the data record for the transportation process or may be a data record for another transportation process. The at least one image found is shown on the display unit such that a check becomes possible to determine whether the image shown on the display unit actually shows the luggage item close to the display unit or another luggage item.

The image thus shows the luggage item in the visible range and not as an X-ray image. This refinement helps to allow the check to determine whether the image actually shows the luggage item which is to be examined in the checking device or another luggage item. If it were necessary to compare the real luggage item with an X-ray image of the luggage item then this check could not be performed reliably.

The invention can be used to search for the luggage item. The luggage item is located in a storage device for luggage items which, in this refinement, acts as a checking device. The search involves searching for the data record for the transportation process, and the image is shown on the display unit. Preferably, the data record is sought using a destination to which the luggage item needs to be transported, and a time period within which the image was taken.

These two details are normally known when searching for the luggage item, and they can therefore be used for searching for the data record. If the luggage item has been lost, on the other hand, the identifier for the transportation process is often unknown. This identifier is also impossible or only difficult to ascertain, since neither the luggage item nor the mobile data storage medium are on hand.

In one application, the invention is used to decide whether the luggage item has been damaged during transportation or was already damaged prior to the start of transportation. For this, the identifier for the transportation process is ascertained as soon as this decision needs to be made, e.g. after transportation has concluded. The data record for the luggage item is ascertained using the transportation process identifier. The at least one image is compared with the real luggage item in its condition at the time of the decision.

In this application, the further data store is therefore searched for the data record only following transportation. It is also possible for the data record to be sought during transportation, in order to monitor the transportation.

In one refinement, the display unit on which the image is shown and also the luggage item to be examined itself are located in the same space or otherwise so close to one another that a screener can alternately view the image and the real luggage item and can perform the comparison.

In another refinement, a camera produces a depiction of the luggage item which is to be examined. This depiction and the image from the data record are compared with one another. This refinement allows the screener to be at a different location than the luggage item.

In one refinement, the luggage item is provided with a mobile data storage medium. The image of the luggage item is produced before the mobile data storage medium is attached to the luggage item. This sequence can easily be integrated into a workflow.

In another refinement, the image of the luggage item is produced after the mobile data storage medium is attached to the luggage item. At least one image shows the luggage item with the mobile data storage medium attached to the luggage item. This refinement simplifies the search for the luggage item when the luggage item is lost during transportation and the mobile data storage medium is still expected to be connected to the luggage item.

Preferably, the image is produced when the luggage item is being examined anyway and is therefore freely accessible from the outside, for example while the luggage item is being weighed or is being X-rayed by an X-ray machine.

In one refinement, the mobile data storage medium is additionally provided with an index for the destination to which the luggage item needs to be transported. This index can be read by a human being and simplifies the transportation, e.g. when the luggage item is transferred during transportation.

Preferably, an identifier is prescribed for the transportation process. This identifier is stored on a mobile data storage medium. The mobile data storage medium is, by way of example, a tag with a bar pattern or an electronic data storage medium. During transportation, the transportation process identifier on the mobile data storage medium is read at least once. This identifier is used to search for the data record for the luggage item. The at least one image of the data record found is displayed on the display unit. By comparing the luggage item with the image, it is possible to establish whether the mobile data storage medium is still attached to the correct luggage item or whether it has been swapped and is now attached to another luggage item.

In one refinement, the at least one image is stored in a mobile data storage medium, and the luggage item is provided with this mobile data storage medium. The mobile data storage medium is used to store further details in relation to the transportation process, e.g. an identifier for the transportation process. When a luggage item is checked, the image is read from the mobile data storage medium and is displayed on a display unit. This refinement allows the check to determine whether the luggage item which is currently being examined is actually the luggage item which is shown on the image in the mobile data storage medium, or whether it is another luggage item. This makes it possible to spot manipulation in which a luggage item was initially provided with one mobile data storage medium and was then provided with another mobile data storage medium, for example in order to smuggle a luggage item on board a means of transport.

In one refinement, the display unit is part of a mobile appliance. A worker uses this mobile appliance with the display unit to search for a luggage item or to examine a luggage item. This involves the worker using the image which is shown on the display unit of the mobile appliance.

Other features which are considered as characteristic for the invention are set forth in the appended claims.

Although the invention is described herein as embodied in a method and an apparatus for monitoring the transportation of a luggage item, it is nevertheless not intended to be limited to the details described, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments.

DETAILED DESCRIPTION OF THE INVENTION

The invention is described below with reference to an exemplary embodiment.

In the exemplary embodiment, the invention is used to monitor the transportation of luggage items belonging to air passengers. The air passengers check in these luggage items at a check-in desk at an airport. Each luggage item is provided with a mobile data storage medium for the duration of transportation. By way of example, the mobile data storage medium is an "IATA baggage tag", which is attached to a handle or to another suitable component of the luggage item for the duration of transportation, or a sticker which is stuck onto the luggage item. An electronic data storage medium, e.g. an RFID chip, which is at least temporarily connected to the luggage item and can be used to store data.

"IATA Resolution 740" defines which information an "IATA baggage tag" needs to contain in what form.

At the check-in desk, there is a labeling device. The labeling device labels each "IATA baggage tag" or each sticker with the respective coding for the luggage item identifier. In the case of an electronic data storage medium, the labeling device stores the coding for the identifier in the data storage medium. When the mobile data storage medium has been provided with the destination airport identifier and the luggage item identifier, the mobile data storage medium is connected to the luggage item.

In the exemplary embodiment, the mobile data storage medium is provided with a machine-readable coding for an identifier for the transportation process by which the luggage item is transported, and an index for the destination airport to which the luggage item needs to be transported and for the flight number by which the luggage item needs to be transported.

The identifier distinguishes the transportation process from all other transportation processes for luggage items which are checked in at a check-in desk within a prescribed period. By way of example, the period is one week. If the luggage item is transported by a further transportation process later, a further identifier for this transportation process is allocated which usually differs from the first identifier.

Preferably, the identifier for the transportation process contains an identifier for the labeling device at the check-in desk. The identifier distinguishes the labeling device from all other labeling devices which are used anywhere, that is to say is explicit worldwide. The identifier for the labeling device allows explicit identification of the check-in desk and hence also of that airport to which the check-in desk belongs.

If the mobile data storage medium used is an "IATA baggage tag" or a sticker, the index used is preferably an abbreviation for the destination airport which can be read by a human, e.g. SXF for the airport Berlin-Brandenburg International in Schönefeld, Berlin. By contrast, the abbreviation and the identifier for the luggage item are first printed onto the data storage medium at the check-in desk, e.g. in the form of a bar pattern ("ID bar code") or in the form of a matrix code.

In one refinement, an electronic data storage medium, e.g. an RFID chip, is connected to the luggage item for the duration of the transportation. The data storage medium is used to store the identifier for the transportation process. It is possible for the destination airport's index to be additionally stored in the electronic data storage medium.

In another refinement, an electronic data storage medium, e.g. an RFID chip, is permanently incorporated in the luggage item. The data storage medium stores an explicit identifier for the luggage item which cannot be overwritten. The identifier distinguishes the luggage item from all other luggage items in which an electronic data storage medium is incorporated.

To produce the identifier for the transportation process, this luggage item identifier is preferably read at the check-in desk. The identifier for the transportation process is produced using the following information:
the luggage item identifier that is read,
the identifier for the labeling device, and
an index for the time at which the luggage item was checked in.

For the duration of the transportation, the luggage item is additionally provided with an "IATA baggage tag" or with a sticker which is provided with an identifier for the transportation process as described above. This mobile data storage medium allows identification and transportation of the luggage item even if the permanently incorporated data storage medium cannot be read, for example because it is damaged.

These three pieces of information distinguish this transportation process from all other transportation processes by which a luggage item with an incorporated electronic data storage medium is transported.

The labeling device is connected to a data processing installation. The data processing installation has a computation unit and a central database or other data management system. The central data management system acts as the further data storage unit. The computation unit is preferably likewise present at the check-in desk. The central data management system is preferably connected to a plurality of computation units at various check-in desks and is located in a control center.

The computation unit generates the identifiers for the transportation processes, e.g. containing a prescribed identifier, which distinguishes the labeling device from all other labeling devices, and a serial number for the luggage item. The generated identifier for the transportation process is first transmitted to the labeling device, which provides the mobile data storage medium with this identifier as described above.

Second, a data record for the transportation process is generated in the central data management system, for example likewise by the computation unit. The data record contains the identifier for the transportation process. The identifier thus connects the transportation process and hence the luggage item to the central data record.

If the luggage item has an explicit identifier which is stored in a mobile data storage medium, for example, and which has been read at the check-in desk as described above, the data record for the transportation process preferably additionally comprises this luggage item identifier.

Preferably, the air passenger checking in this luggage item identifies himself at the check-in desk, e.g. by an identification or a chip card. The air passenger has already been registered when ordering the flight. The data record for the luggage item is used to store an identifier for the air passenger. By way of example, a data record for the air passenger is created and the data record for the transportation process contains a reference to the data record for this air passenger.

Preferably, the data record is also complemented by an index for the time at which the air passenger handed over the luggage item at the check-in desk.

In the exemplary embodiment, a plurality of images are respectively taken for each luggage item after the luggage item is connected to the mobile data storage medium and before the luggage item is loaded into the aircraft for the destination airport. The images are taken by an image recording appliance, for example by an arrangement containing a plurality of digital cameras. This arrangement is arranged such that the digital cameras allow images of the luggage item to be taken from various recording directions. The images thus show the luggage item from various directions. At least one image shows the luggage item with the mobile data storage medium. It is possible for the mobile data storage medium of the luggage item to be concealed on another image. The images show the luggage item when illuminated with light in the range visible to humans. Either artificial light or daylight which is present anyway is used or the luggage item is illuminated.

In one refinement, the images are produced while the luggage item is being weighed. Weighing involves the luggage item being slowed down anyway, which means that recording is a simple matter. In another refinement, the images are produced when the luggage item is being examined to determine whether it contains dangerous articles, for example explosives or firearms. To carry out this examination, the luggage item is X-rayed, e.g. roentgenized. It is possible for a respective image to be taken at various handling stations. The images which are used for the method in line with the solution are not the X-ray images, however, but rather are produced at the same time as the X-ray images in one refinement.

If required, the luggage item is illuminated while the images are being taken so that the luggage item is easily identifiable on the images.

The identifier for the transportation process is read, for example by virtue of the bar pattern with the identifier being read and evaluated. The identifier and the images of the luggage item are transmitted to the computation unit and from there to the central data management system. The central data management system ascertains the data record with this identifier. The data record found in this manner in the central data management system is the data record for the transportation process. The data record found is complemented by those images which are taken for the luggage item.

The data record for the transportation process now contains the now described information. The identifier for the transportation process, under some circumstances the identifier read for the luggage item, an identifier for that air passenger who checked in the luggage item, an index for the check-in desk and for the time at which the luggage item was checked in, and the images of the luggage item with the mobile data storage medium.

The luggage item is then loaded into a mobile container, and this mobile container is taken to an aircraft. All luggage items in the mobile container are loaded into the aircraft and are transported in the aircraft to a destination airport.

Preferably, a security check takes place before a luggage item is transported to this mobile container. The security check involves the identifier on the mobile data storage medium being read. An operative carries a portable reader, e.g. a bar pattern reader ("bar code scanner"). The operative uses this reader to read the bar pattern on the mobile data storage medium. If the luggage item is connected to an RFID chip, the operative uses an RFID reader.

The transportation process identifier which is read is transmitted to the computation unit. Read access to the central data management system is used by the computation unit to ascertain the data record for the transportation process. By evaluating this data record, it is ascertained which air passenger has checked in this luggage item. A check is performed to determine whether the air passenger has already boarded the aircraft. If not, the luggage item is not loaded into the container but rather is detained. This prevents the luggage item from being transported in the aircraft without the air passenger. A first option is that the air passenger has passed through check-in too late and has missed the aircraft and then wishes to retrieve the luggage item. A second option is that someone is attempting to smuggle a luggage item, e.g. containing explosive, on board without boarding the aircraft himself.

The exemplary embodiment reduces the risk of a criminal bypassing this security check by the following practice: the criminal checks in a luggage item at the check-in desk as a supposed air passenger and then provides his luggage item with a mobile data storage medium from another luggage item. This other luggage item belongs to an air passenger who actually wishes to fly on the aircraft. The criminal provides the luggage item of this air passenger with the mobile data storage medium from his own luggage item, for example, so that the swap is not discovered by mere counting. The criminal's luggage item is then connected to the mobile data storage medium of an air passenger who is actually on board.

In the exemplary embodiment, the operative is provided with a reader which additionally has a screen and therefore additionally acts as a mobile display unit. As already illustrated, the identifier read for the transportation process is used to ascertain the data record for the transportation process. This reader is sent the images which have been taken for the luggage item and which are part of the data record that is found. The reader displays the images on the screen, specifically preferably in succession. The operative compares the images of the luggage item which are displayed on the screen with the real luggage item. If at least one image shows a different luggage item than the one which the operative is currently examining then there is the suspicion of manipulation, and a thorough examination is initiated.

It is additionally possible to provide protection for the situation in which a data link between the reader and the central data management system cannot be set up or no data records at all are found. In addition, it could happen that the wrong identifier is read or an incorrect data record is ascertained. For this reason, one refinement involves the mobile data storage medium additionally being used to store at least one of the images of the luggage item. In the case of an RFID chip, the operative reads this image, and the reader shows the image on the display unit. Alternatively, the image is printed onto the sticker or the "IATA baggage tag", for example.

If the luggage item has passed the security check just described, on the other hand, it is loaded into an aircraft and transported to a destination airport. A known occurrence is that the luggage item may be transported to the correct destination airport too late or else to an incorrect airport and the air passenger is unable to pick up his luggage item at the destination airport as planned. In this case, the method based on the exemplary embodiment simplifies the search for the luggage item.

First of all, the identifier for the transportation process is ascertained. If this identifier is not known, the data record for the luggage item is ascertained using other information. The search involves the details about the air passenger, the check-in desk and a period of time in which the luggage item was checked in at this check-in desk being prescribed. If available, the identifier for the luggage item being sought is additionally prescribed. This information is usually known. All data records in the central data management system which meet these demands are sought. Normally, only one data record is left. If not, the correct data record is ascertained using further details, e.g. the images.

Once the correct data record has been found, this data record provides the images for the sought luggage item. These images are transmitted to the computation unit of that output device on which the luggage item is sought. The computation unit transmits the images onward to output appliances with screens on which the images are shown, e.g. mobile output appliances. The images make it easier for operatives to search for the luggage item on the output device. This refinement does not require the mobile data storage medium to be still connected to the luggage item.

In addition, it is not necessary for a mobile data storage medium to be read on each luggage item in order to ascertain its identifier for a transportation process or a luggage item and then to decide whether this luggage item is the luggage item being sought. This practice is time consuming. Instead, the invention means that first of all a preselection is made among luggage items. The transmitted images of the luggage item being sought are used to find luggage items which are similar to the luggage item which is being sought. Among the luggage items preselected in this manner, the luggage item being sought is then identified using the identifier.

In the exemplary embodiment, the invention is additionally used to decide, during or after transportation, whether the luggage item is still in the same state as at the time at which it was checked in at the check-in desk or whether it has been damaged during the transportation hitherto. By way of example, an air passenger complains that his suitcase has been damaged during the flight. As just described, the identifier for the transportation process by which the luggage item surrounding the complaint has been transported is first of all ascertained—either by reading the mobile data storage medium or by searching for the data record. The data record for the transportation process is then ascertained, and the images of the luggage item which are contained in the data record are transmitted to a display unit and shown on a screen. By comparing the images with the real luggage item, it is possible to decide whether the luggage item was already damaged at the time at which the images were produced or was actually not damaged until during transportation.

The invention claimed is:

1. A method for monitoring a transportation process by means of which a luggage item is transported, which comprises the steps of:
    producing at least one computer-accessible image of the luggage item, the at least one computer-accessible image of the luggage item being produced such that it shows the luggage item when illuminated with light in a range visible to humans;
    producing a data record for the transportation process containing the at least one computer-accessible image;
    storing the data record in a data storage unit;

taking the luggage item to a checking device;
searching the data storage unit at least once for the data record for the transportation process; and
showing at least one image which is included in a data record which has been found on a display unit, the image in the data record found is shown on the display unit such that a check becomes possible to determine whether the image shown on the display unit actually shows the luggage item in the checking device or another luggage item;
wherein the data record for the luggage item is complemented by a coding for a destination to which the luggage item needs to be transported, and a coding for a time at which the at least one image was produced, and the searching step involves a destination and a time period being prescribed and being compared with the destination codings and time codings of the stored data records.

2. The method according to claim 1, which further comprises producing the image of the luggage item while measuring what value a prescribed physical feature assumes for the luggage item.

3. The method according to claim 1, which further comprises:
connecting a mobile data storage medium at least temporarily to the luggage item;
using the mobile data storage medium as the data storage medium in which the at least one image of the luggage item is stored; and
reading, at least once during transportation, the image from the mobile data storage medium and showing the image on the display unit.

4. The method according to claim 3, which further comprises providing the mobile data storage medium with an index for a prescribed destination to which the luggage item needs to be transported.

5. The method according to claim 1, which further comprises taking at least two computer-accessible images of the at least one luggage item from two different recording directions, and the data record for the luggage item contains the at least two computer-accessible images of the luggage item.

6. The method according to claim 1, which further comprises:
producing an identifier for the transportation process;
producing the data record such that it additionally contains the identifier; and
prescribing the identifier for the search for the data record.

7. The method according to claim 1, which further comprises forming the display unit as part of a mobile appliance; and
taking the mobile appliance with the display unit to the checking device.

8. The method according to claim 1, which further comprises producing a further image of the luggage item in the checking device, and both the image in the data record and the further image of the luggage item in the checking device are shown on the display unit.

9. The method according to claim 1, wherein said mobile data storage medium is a tag with an identifier.

10. The method according to claim 1, wherein said mobile data storage medium is a tag with a bar pattern.

11. The method according to claim 1, wherein said mobile data storage medium is an electronic storage medium.

12. The method according to claim 1, which further comprise: connecting a mobile data storage medium at least temporarily to the luggage item; and producing the at least one image of the luggage item such that it shows the luggage item to which the mobile data storage medium is attached.

13. An apparatus for monitoring a transportation process by which a luggage item is transported, the apparatus comprising:
a data storage unit; an image recording appliance producing at least one computer-accessible image of the luggage item, said image recording appliance configured to produce the at least one image of the luggage item such that the image shows the luggage item when illuminated with light in a range visible to humans; a display unit configured for showing the image of the luggage item; a data processing installation configured to: produce a data record for the transportation process which contains the at least one image, store the data record in said data storage device, search said data storage unit at least once for the data record for the transportation process, transmit the at least one image which is included in the data record which has been found to said display unit and to actuate said display unit such that said display unit displays the image transmitted, and show on said display unit the image which is included in the data record which has been found; and wherein the data record for the luggage item is complemented by a coding for a destination to which the luggage item needs to be transported, and a coding for a time at which the at least one image was produced, and the searching step involves a destination and a time period being prescribed and being compared with the destination codings and time codings of the stored data records; and wherein the apparatus is configured to show on said display unit the image in the data record found such that a check becomes possible to determine whether the image shown actually shows the luggage item or another luggage item.

14. The apparatus according to claim 13, wherein said display unit is part of a mobile appliance.

15. The apparatus according to claim 13, wherein said mobile data storage medium is a tag with an identifier.

16. The apparatus according to claim 13, wherein said mobile data storage medium is a tag with a bar pattern.

17. The apparatus according to claim 13, wherein said mobile data storage medium is an electronic storage medium.

18. The apparatus according to claim 13, further comprising a data storage medium in a form of a mobile data storage medium, said data processing installation configured to store the at least one image in said mobile data storage medium, said mobile data storage medium at least temporarily connected to the luggage item which is shown by the image in the data record stored in said mobile data storage medium.

19. The apparatus according to claim 18, wherein said image recording appliance is configured to produce an image which shows the luggage item with said mobile data storage medium attached to the luggage item.

* * * * *